United States Patent [19]
Sacher

[11] Patent Number: 5,411,439
[45] Date of Patent: May 2, 1995

[54] TORSIONAL VIBRATION DAMPER

[75] Inventor: Christoph Sacher, Sauerlach/Arget, Germany

[73] Assignee: HURTH Getriebe und Zahnraeder G.m.b.H., Munich, Germany

[21] Appl. No.: 2,153

[22] Filed: Jan. 11, 1993

[30] Foreign Application Priority Data

Jan. 20, 1992 [DE] Germany ............ 42 01 370.4

[51] Int. Cl.⁶ ............... F16D 3/12; F16F 15/121
[52] U.S. Cl. ....................................... 464/67
[58] Field of Search ............ 464/62, 66, 67, 68, 464/160

[56] References Cited

U.S. PATENT DOCUMENTS

| | | | |
|---|---|---|---|
| 720,442 | 3/1903 | Keyser | 464/67 |
| 1,334,537 | 3/1920 | Hupp | 464/67 |
| 4,493,674 | 1/1985 | Tamura et al. | 464/68 |
| 4,518,071 | 5/1985 | Nozawa | 464/67 |
| 4,585,427 | 4/1986 | Lamarche | 464/67 |
| 4,891,033 | 1/1990 | Heyser | 464/66 |
| 5,083,980 | 1/1992 | Focoueur | 464/68 |
| 5,146,804 | 9/1992 | Carmillet | 464/66 |

FOREIGN PATENT DOCUMENTS 231825  2/1964  Austria ............ 464/66

Primary Examiner—Daniel P. Stodola
Assistant Examiner—Eileen A. Dunn
Attorney, Agent, or Firm—Flynn, Thiel, Boutell & Tanis

[57] ABSTRACT

A torsional vibration damper having a driving part coupled to an output shaft of an internal combustion engine and a driven part coupled to an input shaft of a transmission device. The damper is arranged coaxially with respect to the driving part and can be relatively rotated to a limited extent with respect to the driven part. A guide ring is fastened to the driving part, on which guide ring several compression springs are movably supported. The driving part has at least one driving abutment which rests against a rear one of the springs in direction of rotation, and the driven part has a driven abutment which rests against a front one of the springs in direction of rotation.

3 Claims, 4 Drawing Sheets

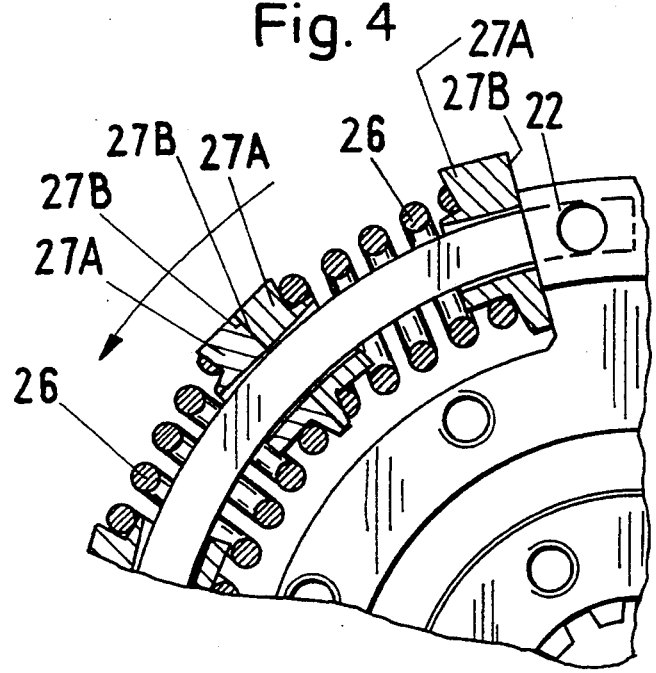

TORSIONAL VIBRATION DAMPER

FIELD OF THE INVENTION

The invention relates to a torsional vibration damper having a driving part adapted to be coupled to a driven shaft of an internal combustion engine, a driven part adapted to be coupled to an input shaft of a transmission device. The driven part is arranged coaxially with respect to the driving part and is relatively rotatable to a limited extent relative thereto. A series of compression springs are arranged coaxially with respect to the driving part and the driven part and successively in a circumferential direction. A guide mechanism is provided for the axial and radial guiding of the springs, with the guide mechanism being supported on either the driving part or on the driven part. At least one driving abutment is rotationally fixedly connected to the driving part, which driving abutment rests on a rearwardly facing one of the springs of the series of springs. At least one further driven abutment is rotationally fixedly connected to the driven part, which driven abutment rests on a frontwardly facing one of the springs of the series of springs.

BACKGROUND OF THE INVENTION

A torsional vibration damper of this class is described in DE 33 02 536 C2. The guide mechanism of this conventional torsional vibration damper consists of two covers fastened on the driving part, which covers have several window-like openings extending in peripheral direction. A compression spring is received in each of the openings. The driven part also has several openings extending in a circumferential direction which receive therein the compression springs and spacers movably arranged between the compression springs. The spacers each consist of two parts arranged at both ends of the opening and one part arranged in the opening, these three parts being riveted to one another. This design of the guide mechanism, on the one hand, and the spacers, on the other hand, requires many differently designed structural parts resulting in high manufacturing costs. One must add that the shape of the covers connected to the driving part requires a relatively expensive tool.

The basic purpose of the invention is to improve the known torsional vibration damper of the same class with respect to manufacturing costs while taking into consideration the required tooling for making it.

SUMMARY OF THE INVENTION

This purpose is attained according to the invention by providing a guiding mechanism for the springs which is arranged within the inside diameter of the springs and consists of a guide ring on which the springs are movably supported.

The torsional vibration damper of the invention can be manufactured inexpensively because individual parts for guiding the springs are made of sheet metal and parts with complicated shapes, which thus require expensive tooling, are not required.

In a torsional vibration damper with several circular-segment-shaped spacers arranged between the compression springs and movable in a circumferential direction relative to the driving part, it is provided that the spacers have an opening extending in the circumferential direction and are movably supported on the guide ring.

In order to minimize the wear of the spacers, it is provided that the guide ring, at least on the surface thereof, consists of a corrosion-resistant material.

The guide ring can be manufactured with low tool costs by first winding a wire like a coil spring, which is then cut into individual windings. The individual windings are deformed after the compression springs and the spacers have been applied, so that plane rings are provided.

The spacers can be manufactured of a temperature-resistant and wear-resistant plastic. A low likelihood of canting results from the inner guideway of the spacers because the relationship between the length and the diameter of the guideway is great.

The spacers have preferably lateral shoulders, the outside diameter of which corresponds with the inside diameter of the compression springs. The lateral shoulders keep the compression springs at all times at a distance from the guide ring so that an uncontrolled frictional contact cannot occur.

In order for the frictional vibration damper to be functional both during normal operation and also during a braking operation of the engine, it is provided that each two driving and driven abutments pointing in opposite directions are fastened to the driving part and on the driven part.

In order for the flywheel forces occurring during the operation of the torsional vibration damper to be in balance, it is furthermore provided that the two radially outwardly projecting arms are rotationally fixedly arranged on the driving part and on the driven part, which arms each form two driving and driven abutments pointing in opposite directions.

The arrangement can thereby be such that the two arms of the driving part and of the driven part are approximately congruent in the at rest condition and that the series of springs is divided into two equal groups. The two groups of springs are in this case active both during the normal operation and also during the braking operation of the engine.

However, the arrangement can also be such that the two arms fastened on the driving and on the driven part are offset approximately at 90° with respect to one another in the at rest condition and that the series of springs is divided into four groups, of which the first and the third group and the second and the fourth group are identical. In this case, during normal operation of the engine only the first and the third group of the series of springs are active, and during the braking operation of the engine only the second and the fourth group of the series of springs are active. The spring deflection is shorter through this, however, there exists the possibility of a different spring characteristic for the normal operation and for the braking operation of the engine. This is of particular interest when the torsional vibration damper is installed into a passenger vehicle or a truck, where the possibility exists that when the vehicle driver lets up on the gas, for example during idling of the engine, the driving wheels introduce a driving force into the transmission device.

In order to obtain a large bearing surface and thus a small surface pressure, it is provided that the two arms arranged on the driven part are formed at the outer end thereof so as to grip over the guide ring.

In order for the fastening of the guide ring on the driving part not to hinder the movement of the springs and of the spacers, the guide ring is preferably fastened on the driving part in the area of the driving abutments.

In order to protect the spacers and the springs during operation against an excessive load, it is provided that abutments are arranged on the driving part and on the driven part which, upon a certain relative rotation of these two parts, engage one another to enable a direct power transfer.

The springs preferably do not rest directly on the driving and driven abutments, but they are supported on these through a halved spacer. However, the spacers can also be composed of two identical halves with respect to a radial plane, with the half spacers resting with the planar dividing surface on the driving or driven abutments.

BRIEF DESCRIPTION OF THE DRAWINGS

One exemplary embodiment of the invention is illustrated in the drawings and will be discussed in greater detail hereinafter. In the drawings:

FIG. 4 is a partial cross-sectional view of the torsional vibration damper illustrating spacers composed of two identical halves.

DETAILED DESCRIPTION

Figure 1:
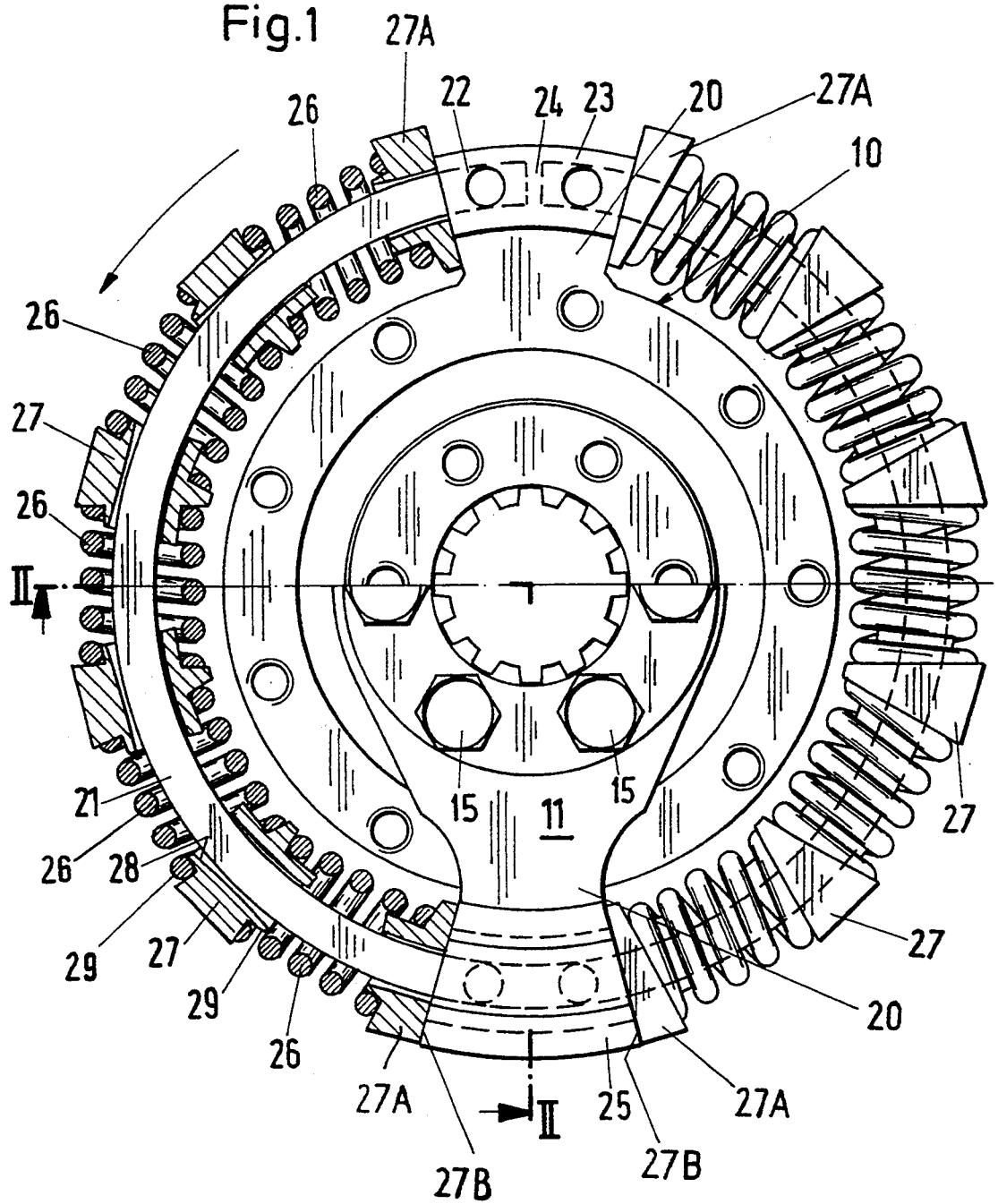
FIG. 1 is a partially cross-sectional view of a torsional vibration damper embodying the invention.
Figure 2:
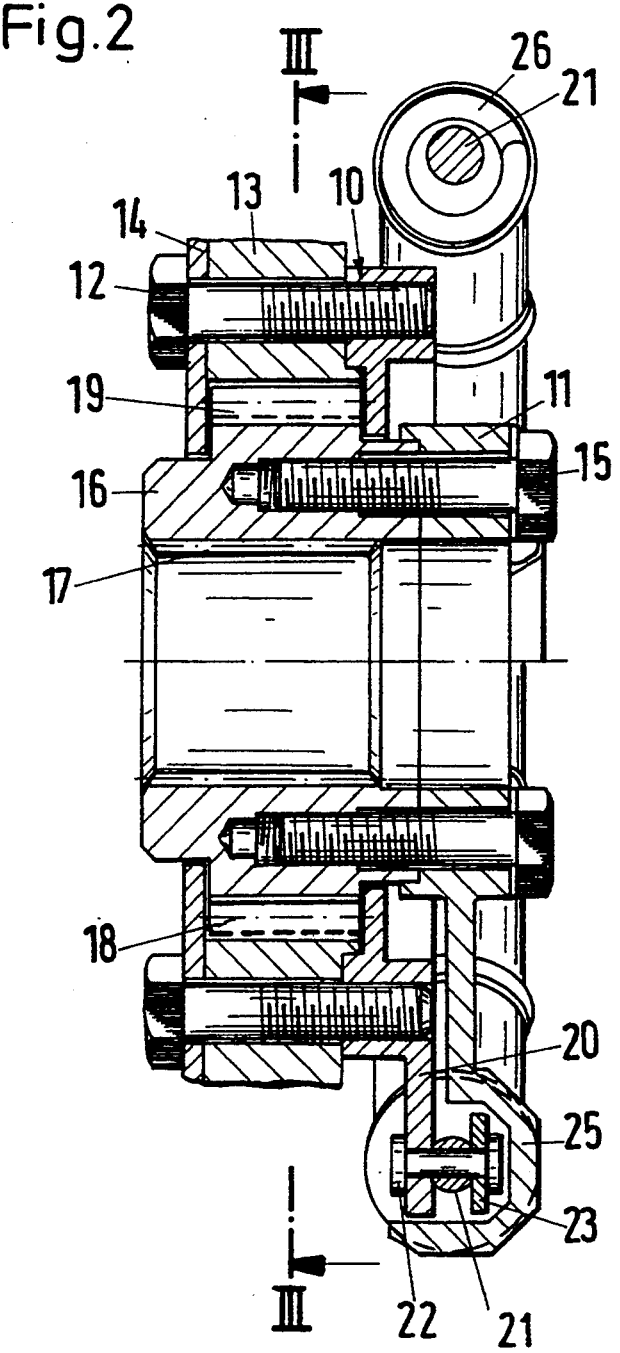
FIG. 2 is a cross-sectional view taken along the line II—II of FIG. 1.

As this is particularly shown in FIGS. 1 and 2, the torsional vibration damper includes a driving part 10 and a driven part 11 coaxially arranged with respect to the driving part 10.

The driving part 10 is rotationally fixedly connected to a driving collar 13 and a disk 14 by several screws 12. The disk 14 is connected to a driven plate or flange (not shown) of an internal combustion engine. The driven part 11 is rotationally fixedly connected to a driven collar 16 by several screws 15. The driven collar 16 has an internal bore with splines 17 for the rotationally fixed connection to an input shaft (not shown) of a transmission device.

Figure 3:
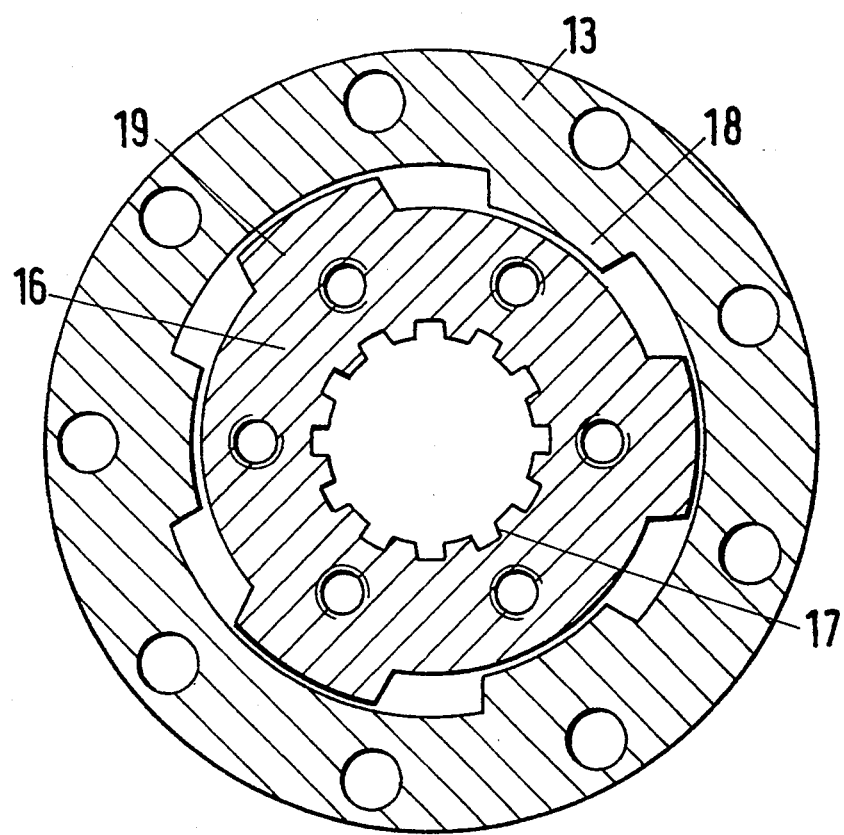
FIG. 3 is a cross-sectional view taken along the line III—III of FIG. 2.

As can be seen in FIG. 3, the driving collar 13 and the driven collar 16 are each provided with three abutments 18 and 19 limiting the relative rotating capability of the two collars 13, 16.

As can be seen in FIG. 1, the driving part 10 has two arms 20 offset at 180° with respect to one another. A ring 21 is fastened to the two arms 20 of the driving part 10 with the help of rivets 22 and bearing plates 23. The ring 21 has in the illustrated exemplary embodiment in the area of the upper arm 20 a gap 24. The ring 21 could, however, also be composed of two halves so that a gap would also exist in the area of the lower arm 20.

The driven part 11 also has two arms 25 offset at 180° with respect to one another, which arms, in the rest position of the torsional vibration damper, are congruent with the two arms 20 of the driving part 10. The outer ends of the arms 25 of the driven part 11 are formed so that they grip over the ring 21. The rivets 22 effect a fastening of the ring to the bearing plates 23. The two side surfaces of each one of the arms 20 of the driving part 10 and of each of the two arms 25 of the driven part 11 extend radially with respect to the center of the torsional vibration damper.

Several compression springs 26 and circular-segment-shaped spacers 27 are arranged on the ring 21. The compression springs 26 and the spacers 27 are moved onto the ring 21 through the gap 24 prior to the gap in the ring being closed by the bearing plates 23 and the rivets 22. The spacers 27 each have an opening 28 therethrough, the diameter of which is slightly larger than the diameter of the wire rod forming the ring 21. The spacers 27 are, therefore, movably guided in a circumferential direction on the ring 21. The opening 28 in each of the spacers 27 is preferably cylindrical. The spacers 27 have furthermore two lateral shoulders 29, the diameter of which is slightly less than the inside diameter of the compression springs 26. The shoulders 29 of the spacers 27 serve as a guide for the compression springs 26 to therefore keep the springs spaced from the ring 21. As can be seen in FIG. 1, a spacer 27 is arranged at each of the mutually adjacent ends of the compression spring 26, with further spacers 27A resting against the circumferentially facing abutments of the arms 20 and 25 of the driving part 10 and the driven part 11, respectively. The further spacers 27A are essentially one-half of a regular spacer 27. In fact, and as shown in FIG. 4, a regular spacer can be defined by two identical halves 27A with respect to a radial plane 27B.

OPERATION

The torsional vibration damper illustrated in the drawings and described above operates as follows:

When the driving part 10, coupled with the driven plate or flange (not shown) of an internal combustion engine, is rotated counterclockwise in the illustration according to FIG. 1, then its two arms 20 take along the spacer 27A resting against the circumferentially facing abutment surface facing the direction of rotation. The two groups of compression springs 26 and spacers 27, 27A are therefore moved counterclockwise on the ring 21. Since the spacers 27A, located at the front of each group in this direction of rotation, is supported on a circumferentially facing surface of the formed end regions of the two arms 25 of the driven part 11, which circumferentially facing surface faces opposite the direction of rotation, the two groups of series arranged compression springs 26 are compressed until the abutments 18 arranged on the driving collar 13 engage the abutments 19 arranged on the driven collar 16. This results in a direct transfer of power from the driving collar 13 to the driven collar 16, and the relative rotating capability of the driving part 10 relative to the driven part 11 and thus the compression of the coiled springs 26 is limited.

Thus torsional vibrations can occur to the extent of the relative rotation of the driving part 10 relative to the driven part 11, which extent is determined by the angular spacing between the abutments 18 and 19 on the driving collar 13 and the driven collar 16, which torsional vibrations are damped by the compression springs 26 and the spacers 27, 27A sliding on the ring 21.

The man skilled in the art recognizes that the illustrated torsional vibration damper is not only functional in the two directions of rotation, but also when a torque is applied to the driving part 10 by the input shaft (not shown) of the transmission device through the driven collar 16. This occurs, for example, when the gas pedal is released in a motor vehicle so that the motor acts as the brake. The circumferentially facing surfaces on the two arms 25 of the driven part 11 which face in the direction of rotation push the mutually adjacent spacers 27A and move these counterclockwise relative to the ring 21. This has the result that the spacers 27A of the two groups which lead the arrangements of compression springs are supported on the circumferentially facing surface of the respective arm 20 of the driving part 10, which surface faces rearwardly relative to the direction of rotation. Therefore, a rotation of the driven part 11 relative to the driving part 10, which relative rotation is dampened by the two groups of compression springs 26, takes place until the abutments 18 and 19 of the driving collar 13 and of the driven collar 16 engage one another.

The spring and damping characteristic can be altered by making the compression springs 26 of different hardness so that they will be successively compressed.

Since the spacers 27, 27A during operation carry out a sliding motion, they must be manufactured of a temperature-resistant and wear-resistant material.

Differing from the exemplary embodiment illustrated in the drawings, the driving part 10 and the driven part 11 can both simply be two radially outwardly extending arms from a central hub.

The embodiments of the invention in which an exclusive property or privilege is claimed are defined as follows:

1. In a torsional vibration damper comprising a driving part adapted to be coupled to a driven shaft of an internal combustion engine, a driven part adapted to be coupled to an input shaft of a transmission device, said driven part being arranged coaxially with respect to said driving part and is relatively rotatable to a limited extent relative thereto, a series of compression springs arranged coaxially with respect to said driving part and said driven part and successively in a circumferential direction, a guide ring on which said series of compression springs are movably supported, with said guide ring being supported on one of said driving part and said driven part, at least one driving abutment rotationally fixedly connected to said driving part, said driving abutment resting on an end of said series of compression springs, which end is a rearwardly facing end relative to the direction of rotation, and at least one driven abutment rotationally fixedly connected to the driven part, said driven abutment resting on a further end of said series of compression springs, which further end is a frontwardly facing end relative to the direction of rotation, the improvement wherein first and second circular-segment-shaped spacers having an opening the diameter of which being slightly larger than the diameter of a rod forming said guide ring are arranged on said guide ring and movable in a circumferential direction thereof, said first spacers having two lateral shoulders the diameter of which being slightly less than the inside diameter of said compression springs for keeping said compression springs spaced from said guide ring, said second spacers having essentially the shape of one-half of said first spacers with respect to a radial plane and resting with a dividing planar surface thereof against said driving abutment and said driven abutment, respectively.

2. The torsional vibration damper according to claim 1, wherein two radially outwardly projecting arms are rotationally fixed to each of said driving part and said driven part, the arms each form the two driving and driven abutments facing in opposite directions.

3. The torsional vibration damper according to claim 1, wherein said first spacers are composed of a pair of said second spacers.

* * * * *